Dec. 19, 1922.
R. D. CURRIE.
AUTOMOBILE LOCK.
FILED OCT. 29. 1919.
1,439,150
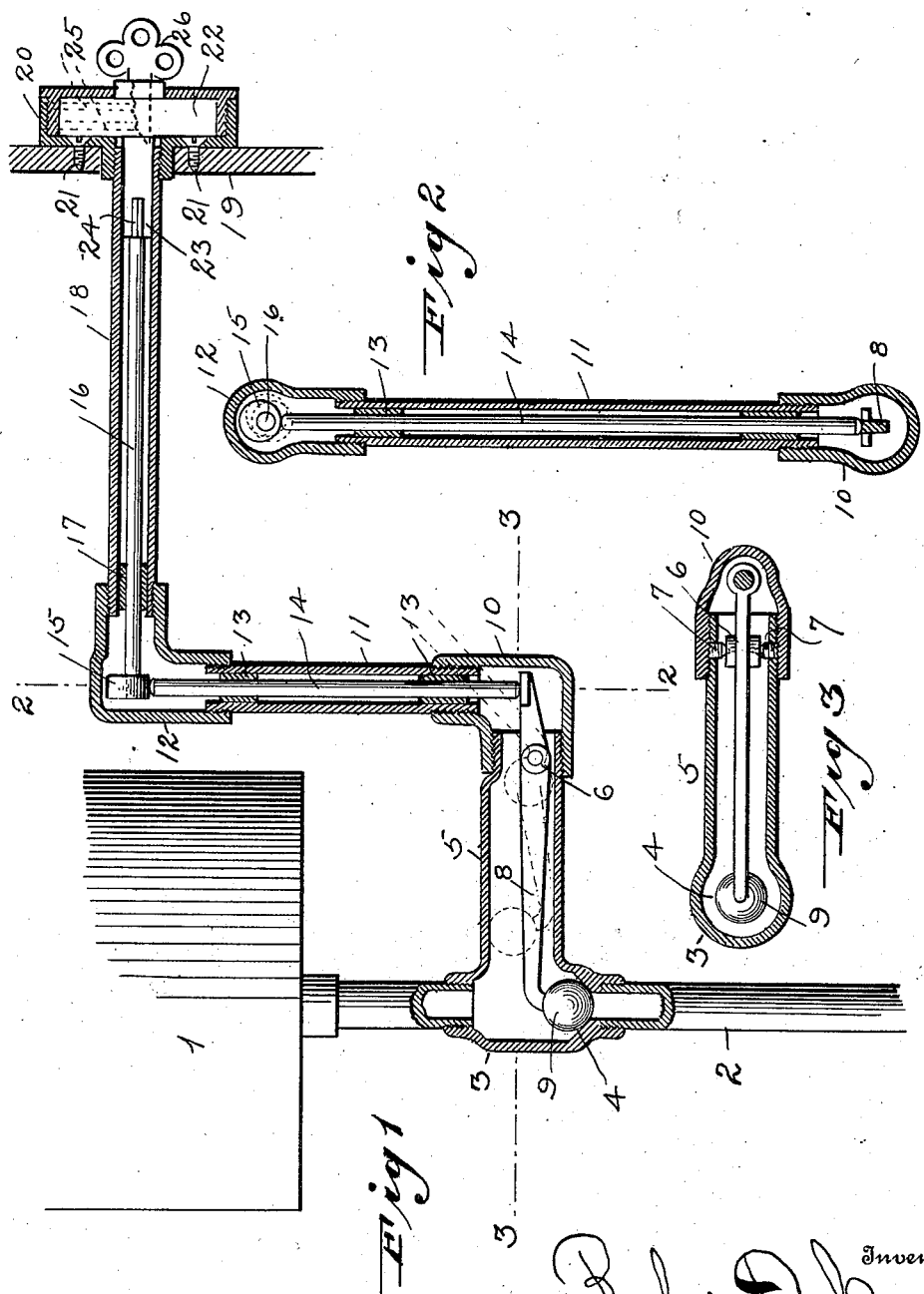

Patented Dec. 19, 1922.

1,439,150

UNITED STATES PATENT OFFICE.

RUFUS D. CURRIE, OF DAYTON, OHIO.

AUTOMOBILE LOCK.

Application filed October 29, 1919. Serial No. 334,256.

*To all whom it may concern:*

Be it known that I, RUFUS D. CURRIE, a citizen of the United States, residing at Dayton, in the county of Montgomery and State of Ohio, have invented certain new and useful Improvements in Automobile Locks, of which the following is a specification.

My invention relates to improvements in automobiles, and particularly to means for preventing theft or the unauthorized use of such vehicles by arresting the fuel supply.

The object of the invention is to simplify the structure as well as the means and mode of operation of vehicle locking apparatus whereby they will not only be cheapened in construction, but will be more efficient in use, positive in operation, easily applied to existing vehicles, and unlikely to get out of repair.

A further object of the invention is to provide a dash or cowl board locking device, which will control the fuel supply and which will operate through a tortuous passage from the cowl board or dash to the fuel supply tank.

With the above primary and other incidental objects in view as will more fully appear in the specification, the invention consists of the features of construction, the parts and combinations thereof, and the mode of operation, or their equivalents as hereinafter described and set forth in the claims.

In the drawings Fig. 1 is a sectional view of the assembled apparatus forming the subject matter hereof. Fig. 2 is a longitudinal sectional view on line 2—2 of Fig. 1. Fig. 3 is a longitudinal sectional view on line 3—3 of Fig. 1.

As disclosed in the drawing, 1 is the fuel tank or reservoir of a motor vehicle and 2 the supply conduit leading from such reservoir to the carburetor of the vehicle motor. Located in the conduit 2 is a T-shaped fitting 3 embodying a valve seat 4 and an elongated laterally projecting sleeve or tubular extension 5. Pivoted at 6 upon inward projecting trunnions 7 and extending longitudinally within the tubular extension 5 is an oscillatory arm or lever 8 carrying at its extremity a ball valve head 9 which when the lever or arm 8 is depressed rests upon the valve seat 4 and closes the supply conduit 2. The extremity of the sleeve or tubular extension 5 of the fitting 3 is screw threaded to receive an elbow 10. It is to be noted that the trunnions 7 which are screw threaded into the walls of the sleeve or extension 5 are located adjacent to the end thereof and in the screw threaded portion of such sleeve or extension whereby they are enclosed and covered by the elbow 10, where the latter is engaged with such extension. Engaged with the elbow 10 is a tubular housing or member 11 engaging at its opposite end with a second elbow 12. Extending through the tubular housing 11 and mounted for reciprocatory movement therein in bearings or bushings 13, is a rod 14 one end of which bears upon the short arm of the lever 8 within the elbow 10. The upper end of the actuating rod 14 extends within the second mentioned elbow 12 and is engaged by an eccentric head 15 carried by a revoluble rod or stem 16. The stem 16 is mounted in suitable bearings or bushings 17 located within a tube or housing 18 connected with and extending laterally from the elbow 12. The construction is such that upon the rotation of the rod or stem 16 the eccentric head 15 forces downward the reciprocatory actuating rod or stem 14, thus depressing the short arm of the lever 8 and elevating the ball valve 9 off of its seat 4 to permit the passage of fuel from the tank 1 through the conduit 2. The stem or rod 16 is controlled from the dash or cowl board 19 of the vehicle upon which is mounted any suitable lock for said rod. Any convenient form of locking apparatus which will prevent the unauthorized rotation of the rod or stem 16 may be employed. Since the lock per se forms no part of the present invention the details of the locking apparatus have been omitted. It will suffice to say, however, the lock as shown in the drawing is of the Yale type and comprises a housing 20, screw threaded upon the extremity of the tubular member 18, and further attached to the dash or cowl board 19 by screws 21. These screws 21 are inserted from the interior of the housing, whereby they are inaccessible when the device is locked. Revolubly mounted within the housing is a rotary head 22 having a neck or stem portion 23 extending within the tubular housing 18. This neck or stem 23 is provided with a socket or recess to receive the squared end 24 of the rotary stem 16. The head 22 is key controlled and is provided with tumblers or plungers 25 adjusted to releasing positions by means of the key 26. The housing 20 is provided with a cover 27, screw threaded within the housing 20 and locked against disengagement by the plungers or tumblers before mentioned. It will be understood that other forms of lock may be employed. It will be obvious that only by rotating the rod 16 to depress the rod 14 and thereby oscillate the arm 8, can the valve 9 be lifted from its seat and the conduit 2 opened to permit the passage of fuel. Inasmuch as the lever 8, carrying the head 9 can not be inserted directly into the tubular sleeve 5 in position to engage the seat 4, the lever is reversed and inserted with the head 9 upwardly. The successive positions of the lever and head are shown by dotted lines in Fig. 1. When the head 9 has reached the transverse portion of the fitting 3, the lever 8 can be rotated through a half revolution to bring the head into position to engage the seat 4.

From the above description it will be apparent that there is thus provided a device of the character described possessing the particular features of advantage before enumerated as desirable, but which obviously is susceptible of modification in its forms, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. In a construction of the character described, the combination with a reservoir and an outlet conduit leading therefrom, of a valve adapted to close said conduit, valve operating means comprising a series of operatively associated movable shafts operable through a tortuous path, a tortuous casing, wholly enclosing the series of shafts, and means connected with the casing for locking the valve operating means.

2. In a construction of the character described, the combination with a reservoir, and an outlet conduit leading therefrom, of a valve adapted to close the conduit, valve operating means operable through a tortuous path comprising a succession of angularly disposed movable rods, operatively associated one with another, and a tortuous housing wholly enclosing said valve operating rods.

3. The combination with a motor vehicle, a fuel reservoir therefor and an outlet conduit from the reservoir, of a valve adapted to close the conduit, valve operating means comprising a series of alternating rock shafts and plungers extending from the valve to the dash of the vehicle, means upon the dash of the vehicle for locking the valve operating means against operation, and a protective casing wholly enclosing said valve operating means, intermediate the valve and said locking means.

4. In a construction of the character described, a reservoir, an outlet conduit therefrom, a valve adapted to close said conduit, a pivoted lever upon which the valve is carried, a housing enclosing said lever, a depressible plunger extending within the housing and engaging the lever adapted by its depression to move said lever to operate the valve.

5. In a construction of the character described, a reservoir, an outlet conduit therefrom, a valve adapted to close said conduit, a pivoted lever upon which the valve is carried, a housing enclosing said lever, said housing including two interconnected sections, a pivot for said lever in one of said housing sections, the other section enclosing the portion of the first section containing said pivot and preventing access thereto.

6. In a construction of the character described, a reservoir, an outlet conduit therefrom, a valve adapted to close said conduit, a pivoted lever upon which the valve is carried, actuating means therefor including a reciprocatory member, and a rotary member the operation of one of which actuates the other to in turn oscillate said lever, and a housing enclosing the lever and operating members.

7. In a construction of the character described, a reservoir, an outlet conduit therefrom, a valve adapted to close said conduit, a pivoted lever upon which the valve is carried, actuating means comprising a succession of interconnecting rigid sections, different sections being angularly disposed in relation one with another therefor including a reciprocatory member, and a rotary cam member adapted by its rotation to actuate the reciprocatory member to actuate the lever.

8. In a construction of the character described, a reservoir, an outlet conduit therefrom, a valve adapted to close said conduit, a pivoted lever upon which the valve is carried, actuating means therefor including a reciprocatory member, a revoluble shaft, an eccentric carried thereby into the path of which the reciprocatory member extends, means for rotating the shaft to effect the longitudinal movement of the reciprocatory member by the action of the eccentric, and means for locking the shaft against rotation.

9. In a construction of the character described, a reservoir, an outlet conduit therefor, a valve controlling said conduit, a housing extending through a succession of angularly disposed branches, a valve rod comprising a succession of operatively associated sections operable through said housing and wholly enclosed thereby and means for locking the valve rod.

10. In a motor vehicle, a reservoir for fuel an outlet conduit therefrom, a valve controlling the conduit, a tubular housing extending from the valve to the dash of the vehicle, valve operating means comprising a succession of operatively associated rigid sections, different sections being angularly disposed in relation one with another within said housing, means upon the dash of the vehicle for actuating the valve operating means and a lock to control the operation thereof.

11. In a device of the character described, the combination with a fuel tank for a motor vehicle having an outlet, of an outlet valve for said tank, a fuel supply line leading from the valved outlet and a second conduit leading from the valved outlet to the dash of the vehicle, valve operating means comprising a series of rods operatively related one to another for transmitting movement thru said second conduit from the dash to the valve, said series of related rods being wholly enclosed by said conduit and being operatively connected with the valve, and means for locking said rods against movement.

12. The combination with a fuel tank and an outlet valve therefor, of valve operating means comprising a series of operatively related movable shaft sections the successive sections being angularly arranged and capable of transmitting operative movement thru a tortuous path to said valve, a tortuous casing wholly enclosing the series of valve operating shafts.

In testimony whereof, I have hereunto set my hand this 11th day of October A. D. 1919.

RUFUS D. CURRIE.

Witnesses:
JOHN DINEEN,
F. L. WALKER.